No. 867,081. PATENTED SEPT. 24, 1907.
J. J. ROBINSON.
GAGE.
APPLICATION FILED JAN. 27, 1906.
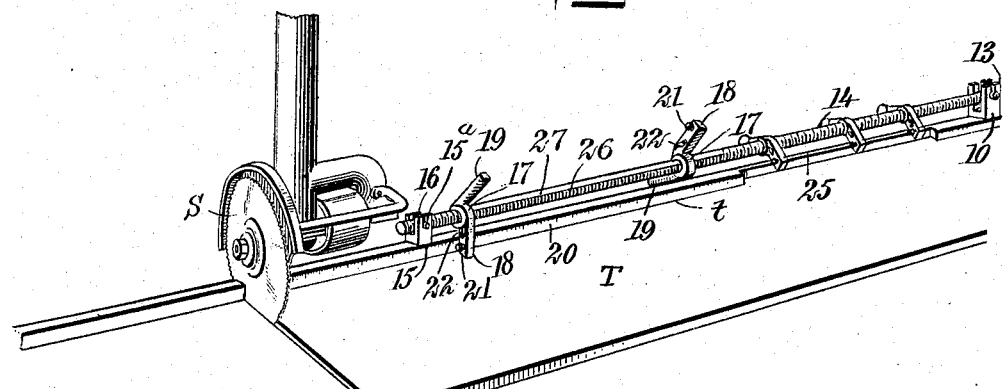
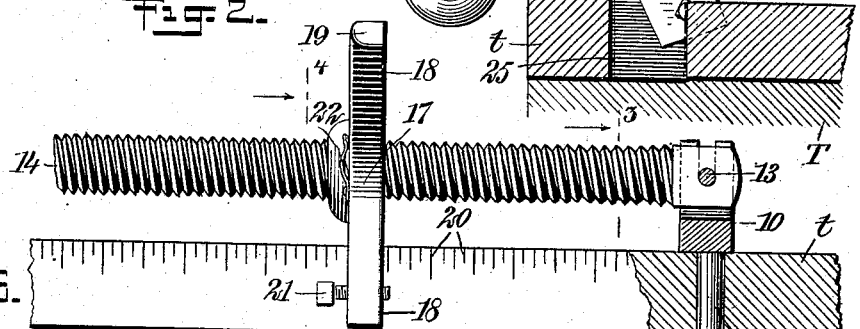
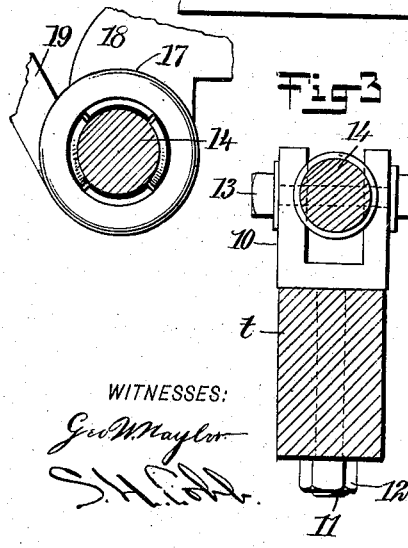
WITNESSES:
INVENTOR
Jonathan J. Robinson
BY
ATTORNEYS

UNITED STATES PATENT OFFICE.

JONATHAN JOHN ROBINSON, OF BLOOMSBURG, PENNSYLVANIA.

GAGE.

No. 867,081.  Specification of Letters Patent.  Patented Sept. 24, 1907.

Application filed January 27, 1906. Serial No. 298,135.

*To all whom it may concern:*

Be it known that I, JONATHAN JOHN ROBINSON, a citizen of the United States, and a resident of Bloomsburg, in the county of Columbia and State of Pennsylvania, have invented a new and Improved Gage, of which the following is a full, clear, and exact description.

My invention relates to gages for use in connection with saws and other wood-working machinery. It has for its principal objects the provision of a simple, accurate and readily manipulated gage apparatus.

Reference is to be had to the accompanying drawings forming a part of this specification, in which similar characters of reference indicate corresponding parts in all the views.

Figure 1 is a perspective view of a cut-off saw having one embodiment of my invention applied to it; Fig. 2 is an enlarged detail in side elevation of a portion of the gage apparatus; Figs. 3 and 4 are transverse sectional details on the lines 3—3 and 4—4, respectively, of Fig. 2; Fig. 5 shows in transverse section another form of my invention; and Fig. 6 is a cross-section through the carrier-bar and illustrating a construction for facilitating the adjustment of the gage.

I have here illustrated a cut-off saw S movable over a table T, which has a longitudinally-extending guide-bar t.

Rising from the table, it being here shown as carried by the guide-bar, is a support in the form of a yoke 10 having a stem 11 extending through an opening in the bar. At its lower end the stem is threaded to receive a nut 12, by which the support is retained against displacement while permitting it to rotate about its axis. Pivoted upon the yoke, conveniently by means of trunnion-screws 13, 13, is a carrier-bar 14 preferably in the form of a screw.

The carrier-bar may be held in a horizontal position parallel to the guide by means of a second support 15 situated adjacent to the saw. This support 15 has a socket 16 coöperating with a transverse pin 15ª in the bar, which may be readily raised by virtue of its connection to the opposite support.

Mounted upon the carrier-bar are gage members 17, of which there may be any desired number, each of which has an opening tapped as described hereinafter to receive the screw. Each gage member includes a gage or contact-arm 18, which may be turned parallel to the guide of the table. Extending forwardly from the gage-arm is a second arm 19, which may be engaged by the operator to turn the other arm into its active or idle position and which, also, by its contact with the guide or some other portion of the table, limits the movement of the gage member. In addition the arm 19 with its companion arm, so weights the gage member that the last-named arm is held normally in contact with the guide-bar. Upon the inner face of the guide-bar a scale 20 is preferably inscribed, this serving to set the gage members with relation to the saw.

I prefer to provide the part of the carrier-bar remote from the saw with a plain thread 25 as shown; the part adjacent to the saw is made with an interrupted thread 26; this is formed by providing longitudinal grooves 27 in the carrier-bar extending to the root of the thread.

The gage-members 17 are provided with interrupted threads and the threads are short enough to allow of disengagement when the gage members are rotated back as indicated most clearly in Fig. 6; when disengaged in this way, the gage members may be readily slipped along to any point where they may be locked again by rotating them until their threads engage. In Fig. 1 I show two of these gage members 17, the more distant one being represented as tipped back out of the way and not in use. While I have shown two of these gage members 17, there may be any number of them, as desired.

The gage members 23 which are out of reach of the saw-operator, I prefer to construct as indicated in Fig. 5. These have short arms or dogs 18 with counterweights 24 which tend to hold them so that they project normally into the space occupied by the piece which is to be cut off. That part of the gage-bar which lies adjacent to these gage members 23, is provided with a longitudinal recess 25. If the dogs 18 are depressed sufficiently, they move back into this recess so that they pass out of the way of a piece of stock applied to the table at the guide-bar or scale. Evidently, the gage members may be depressed out of the way as described, by the stock to be cut off held in the hand of the operator.

In using the counterweighted gage-members, several of them may be arranged as shown, so as to cut off desired lengths. The common gage members will be thrown back out of the way as described; the operator can then use any one of the counterweighted gage members as a stop or gage by pressing those lying intermediate out of the way with the stock, advancing the piece until its extremity engages the selected gage member. In this way the operator can cut off pieces of different lengths without moving from his position at the saw.

To furnish a more delicate adjustment, or one between those which could be secured by the rotation of the gage members upon the carrier-screw, this, of course, being limited by their thickness, each gage may be provided with a contact member. This I have illustrated as a screw 21 threaded through the arm 18. After the approximate length has been obtained by the turning of the main member about the carrier-bar, this auxiliary member may be adjusted to give the exact dimension.

Upon each of the arms 18 is shown a holder or spring clip 22. This is adapted to receive a ticket or slip, which will indicate to the workman the length and number of pieces of work which are to be cut by employing that particular member.

It should be noted that the carrier-screw having been cut to a definite number of threads to the inch, serves to determine the position of the gage members, since a movement over any number of threads will effect a known advance. Furthermore, by the employment of a threaded carrier, ease of rotation of the gage members is secured, while they are at the same time retained against longitudinal movement upon the carrier.

Having thus described my invention I claim as new and desire to secure by Letters Patent:

1. The combination with a table provided with a longitudinally extending guide-bar having a longitudinal recess at one end, of supports carried by the guide-bar, the support adjacent to the recess of the guide-bar being pivoted, a screw-threaded carrier-bar having a portion of its thread interrupted, the end of the bar with the uninterrupted thread being pivoted to the pivoted support and having its other end in detachable engagement with the other support, and a plurality of angular gage-members on the carrier-bar, sundry of the gage-members having interrupted threads and movable parallel with the guide-bar, the remainder of the gage-members being opposite the recess of the guide-bar, and so mounted as to normally project beyond the recess, but capable of being swung into the said recess.

2. The combination of a table provided with a longitudinally extending guide-bar having a longitudinal recess at one end, a screw-threaded carrier bar mounted above the guide-bar and having a portion of its thread interrupted, and a plurality of angular gage-members on the carrier bar, sundry of the gage-members having interrupted threads and movable parallel with the guide-bar of the table, the remainder of the gage-members being opposite the recess of the guide-bar and so mounted as to normally project beyond the recess, but capable of being swung into the said recess.

3. A gage, comprising spaced supports, one of which is pivoted, a screw-threaded carrier-bar having a portion of its thread interrupted, the end of the bar with the uninterrupted thread being pivoted to the pivoted support and its other end held in detachable engagement with the other support, and a plurality of angular gage-members on the carrier bar, sundry of the gage-members having interrupted threads.

4. A gage, comprising a pivoted and screw-threaded carrier-bar having a portion of its thread interrupted, and a plurality of angular gage-members on the bar, sundry of the gage-members having interrupted threads.

5. In a gage, the combination of spaced supports, one of which is pivoted, a screw-threaded carrier-bar having one end pivoted to the pivoted support and its other end held in detachable engagement with the other support, and a plurality of gage-members having threaded openings to receive the said carrier-bar.

6. In a gage, a carrier bar having an interrupted thread and a gage member on the carrier bar, said gage member having an interrupted thread and provided with a handle for manipulating it, said handle also serving to hold the gage member in active position.

7. In a gage, spaced supports, a screw-threaded carrier-bar having one end pivoted to one support and its other end detachably held in the other support, and gage-members mounted on the carrier-bar.

8. In a gage, a table provided with a guide-bar having a longitudinal recess at one end, a carrier-bar mounted upon the table parallel with the guide-bar, and a plurality of gage-members mounted upon the carrier-bar, sundry of the gage-members being opposite the recess of the guide-bar and so mounted as to normally project beyond the recess, but capable of being swung into the said recess, the remainder of the gage members being so mounted as to be turned out of the way when not in use.

9. A gage, comprising a screw-threaded carrier bar having an interrupted thread, and a plurality of gage-members on the bar, sundry of the gage-members having interrupted threads.

10. A gage, comprising a screw-threaded carrier bar having an interrupted thread, and a plurality of gage-members on the bar and each provided with a projection which serves both as a handle and means for holding the gage-members in active position, sundry of the gage-members having interrupted threads.

In testimony whereof I have signed my name to this specification in the presence of two subscribing witnesses.

JONATHAN JOHN ROBINSON.

Witnesses:
F. D. AMMEN,
JNO. M. RITTER.